United States Patent [19]

Hart

[11] Patent Number: 4,670,912

[45] Date of Patent: Jun. 9, 1987

[54] ADJUSTABLE NIGHT VISION GOGGLE MOUNTING BRACKET

[75] Inventor: Richard T. Hart, Garland, Tex.

[73] Assignee: Varo, Inc., Garland, Tex.

[21] Appl. No.: 808,151

[22] Filed: Dec. 12, 1985

[51] Int. Cl.[4] .......................... A42B 1/24; A61F 9/02
[52] U.S. Cl. ........................................ 2/209.1; 2/6; 2/426; 350/248; 350/547
[58] Field of Search ................. 2/6, 10, 424, 422, 426, 2/209.1; 350/248, 249, 638, 547, 548, 549

[56] References Cited

U.S. PATENT DOCUMENTS

| | | | |
|---|---|---|---|
| 3,425,769 | 2/1969 | Stone | 350/248 X |
| 3,631,540 | 1/1972 | Penny | 2/6 |
| 4,457,461 | 7/1984 | Docking | 2/6 X |
| 4,463,252 | 7/1984 | Brennan | 250/213 VT |
| 4,592,096 | 6/1986 | Glasheen | 350/547 X |

FOREIGN PATENT DOCUMENTS 0877194  9/1961  United Kingdom ............... 350/146

Primary Examiner—Peter Nerbun
Attorney, Agent, or Firm—Jerry W. Mills; Roger N. Chauza

[57] ABSTRACT

An adjustment mechanism for adjusting headgear-mounted vision equipment with respect to the viewer's eyes. A goggle (14) is mounted to a carriage (20) which is slideable on a frame (10) mounted to the headgear (12). The carriage (20) is slideable on a rail (16) by a tongue and groove arrangement (48), and slideable on a rod (42). The carriage (20) includes a cavity (62) with a coil spring (64) therein encircling the rod (42). In its relaxed state, the coil spring (64) firmly engages the rod (42) and prevents movement of the carriage (20) on the rod (42). The coil spring ends (66, 68) are compressible together to release the engagement of the coil spring (64) about the rod (42). A finger-operated plunger assembly (28) includes a slotted end (118) for engaging one spring end (68). When the plunger button (116) is depressed, the spring ends (66, 68) are pressed together, thereby permitting adjustment of the carriage (20) on the rod (42).

30 Claims, 17 Drawing Figures

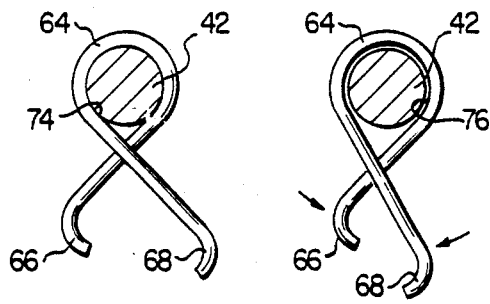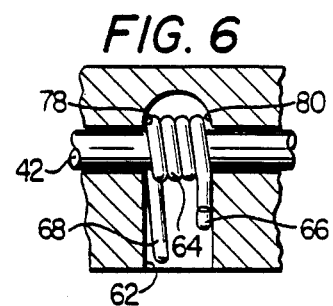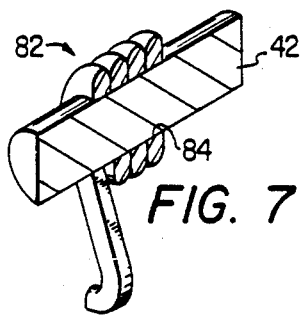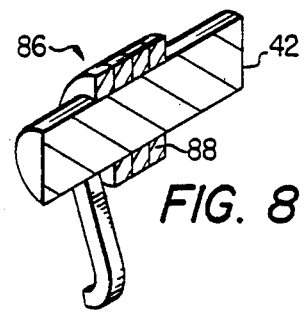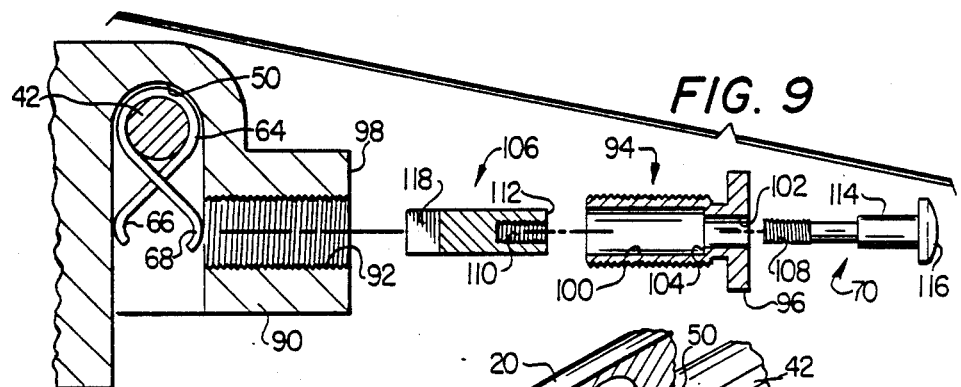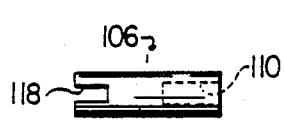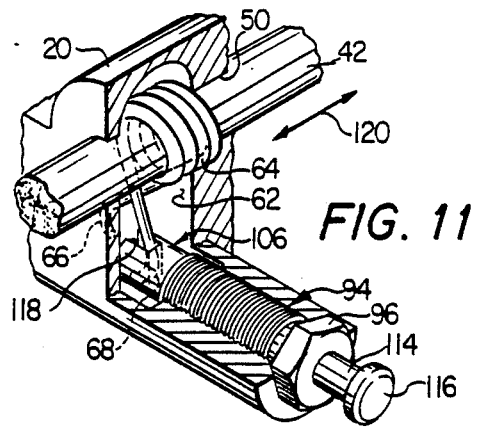

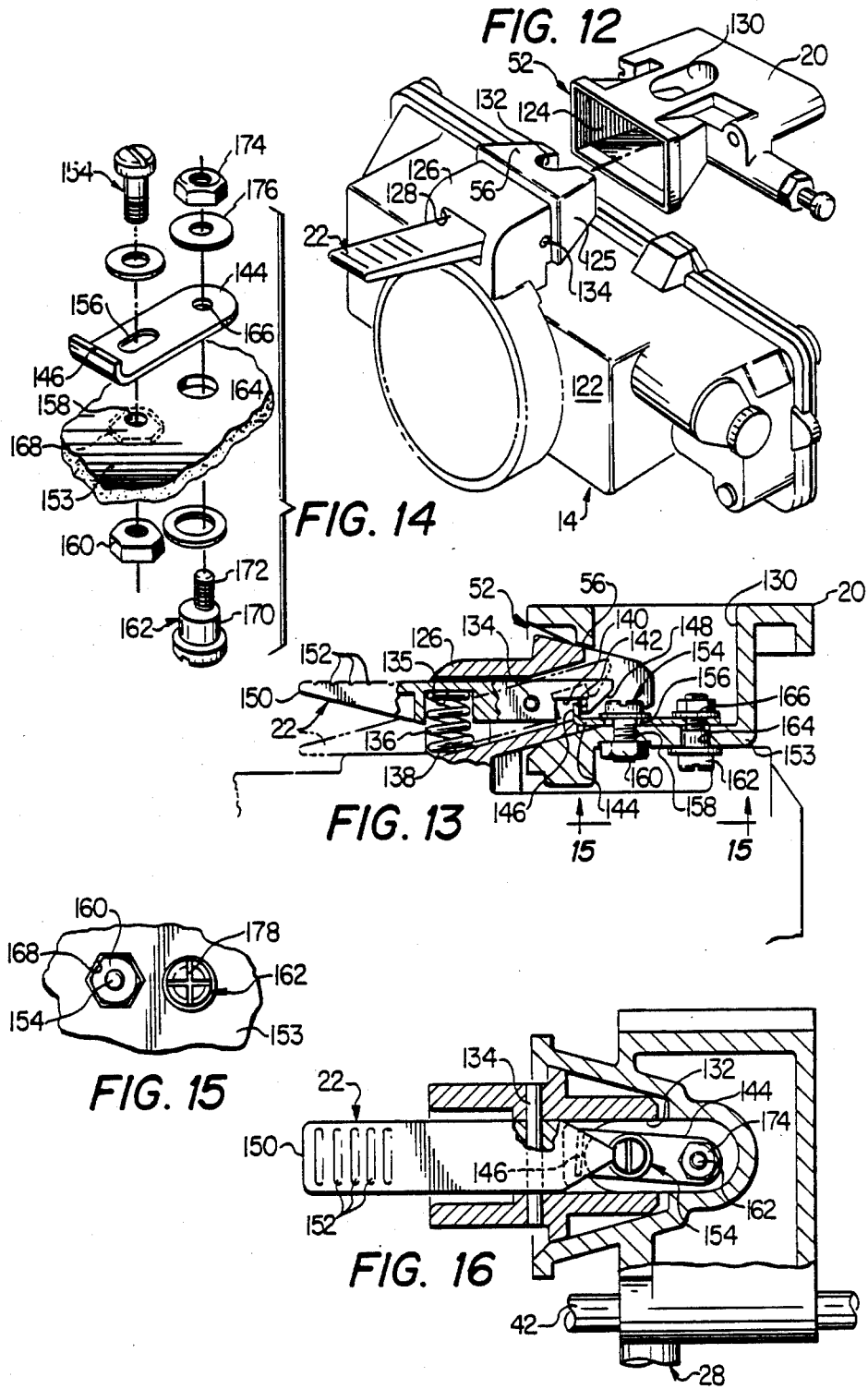

ADJUSTABLE NIGHT VISION GOGGLE MOUNTING BRACKET

RELATED APPLICATIONS

"Night Vision Goggle Headgear", by William A. Kastendieck and Richard T. Hart, filed concurrently herewith, Ser. No. 808,152;

"Passive Proximity Battery Control Circuit for Night Vision Goggles", by William A. Kastendieck and Thomas E. Broyles, filed concurrently herewith, Ser. No. 808,120;

"Quick Release Bracket for Night Vision Goggles", by William A. Kastendieck, Richard T. Hart and Wayne Isbell, filed concurrently herewith, Ser. No. 808,092, all assigned to the present assignee.

TECHNICAL FIELD OF THE INVENTION

The present invention relates in general to mounting apparatus, and more particularly relates to methods and apparatus for mounting vision equipment to headgear.

BACKGROUND OF THE INVENTION

Night vision goggles have enabled military operations to continue, uninterrupted by nightfall. Indeed, those personnel with night vision goggles have been shown to have a definite advantage over adversaries who are not so equipped. Night vision goggles operate on a principle in which reflections of dimly lit objects are amplified many times, and then projected on a phosphor-coated display within the goggle. The viewer can thus observe the objects displayed even during the night. Goggles of this type are disclosed in U.S. Pat. No. 4,463,252, and are normally affixed to headgear for hands-off wearing by the user.

While night vision goggles are ideally adapted for use in night combat, it is necessary that these advantages are not compromised. For example, both hands must remain free for use in carrying out other activities. Therefore, headgear has been provided for mounting the goggle to the wearer's head. In addition, in order to accommodate a single style of headgear and goggle to a variety of cranial shapes, the goggle must be adjustable with respect to the headgear. More particularly, the goggle is preferably adjustable along the line of sight of the wearer.

Various expedients have been proposed in an effort to provide adjustable goggles. One approach is disclosed in the noted patent, and includes a sliding detent arrangement for adjusting the goggles in increments along the line of sight path. While this approach provides a certain degree of adjustability, the adjustments are awkward in that one must "hunt" for the detent in order for the goggle position to be locked therein. Also, very fine gradations of adjustments are not possible.

From the foregoing, it may be seen that a need has arisen for night goggle mounting apparatus which is quickly and easily adjustable to any desired degree.

SUMMARY OF THE INVENTION

In accordance with the present invention, vision equipment mounting apparatus is provided which substantially eliminates or reduces the problems associated with the prior art techniques.

In accordance with a principal aspect of the invention, there is provided goggle mounting apparatus which includes a pair of spaced-apart rails which form a cantilevered bracket. A rod is mounted to the bracket in parallel with the rails, and is disposed through a bore in the carriage. The carriage is thereby slideably movable over the rod and one of the two rails.

A cavity is provided within the carriage, and around the rod. A coil spring with hairpin ends is disposed within the cavity with the coil encircling the rod. In the relaxed state, the spring frictionally engages the rod and thereby prevents slideable movement of the carriage thereon. A finger-operated plunger is provided for compressing the spring ends and enlarging the diameter of the spring coil, thereby releasing the frictional engagement of the spring, and thus the carriage engagement with the rod. Very fine goggle adjustments can be quickly and easily made.

BRIEF DESCRIPTION OF THE DRAWINGS

Further features and advantages of the present invention will become apparent from a description of an illustrative embodiment thereof, taken in conjunction with the accompanying drawings, in which:

FIGS. 5a and 5b illustrate the frictional engagement of the coil spring around the rod, and the nonengagement thereof when the spring ends are compressed together;

FIG. 6 is a sectional view of a part of the carriage adjusting mechanism, taken along line 6—6 of FIG. 4;

FIGS. 7 and 8 are alternative forms of the coil spring.

FIG. 9 is an enlarged cross-sectional and exploded view of the carriage adjustment mechanism;

FIG. 10 is a top view of the slotted spring engaging member;

FIG. 11 is an isometric cross-sectional view of the carriage adjusting apparatus;

FIG. 12 is an isometric view of the goggle in a position aligned for engagement of the goggle stud within the mounting bracket receptacle;

FIG. 13 is a cross-sectional side view of the goggle stud engaged within the bracket receptacle;

FIG. 14 is an isometric and exploded view of catch mechanism eccentric adjustment;

FIG. 15 is a bottom view of FIG. 14; and

FIG. 16 is a top sectional view of the goggle stud engaged within the bracket receptacle.

DETAILED DESCRIPTION OF THE INVENTION

The Goggle Apparatus

Figure 1:
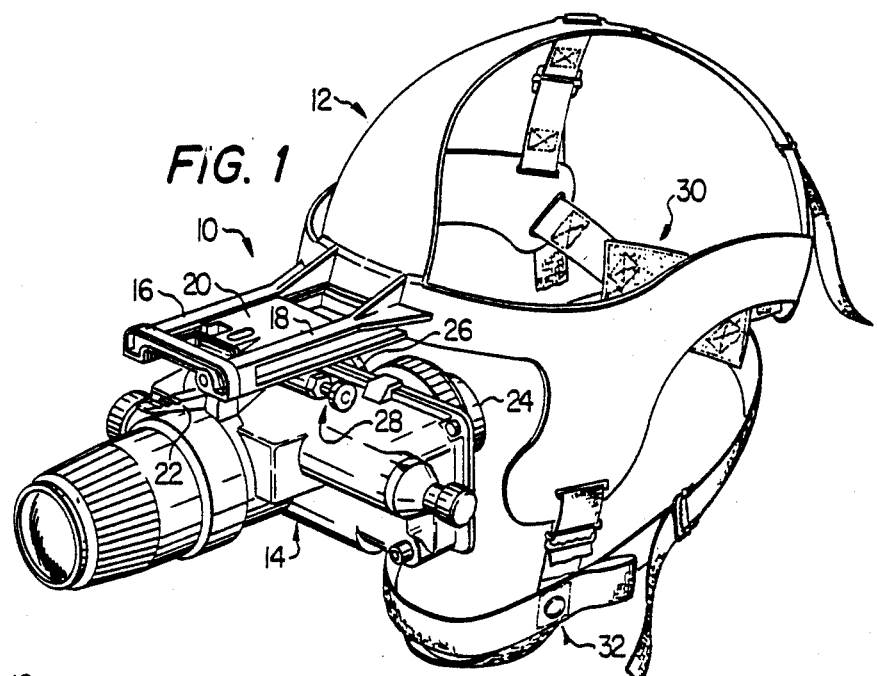
FIG. 1 is an isometric view of the vision equipment mounting apparatus formed integral with a headgear, and having attached thereto a night vision goggle.

Referring generally to the drawings, a vision equipment mounting technique embodying the features and advantages of the present invention is shown. While the principles of the invention may be employed in a variety of applications, FIG. 1 is illustrative of an application in which the invention is ideally suited. The goggle mounting bracket identified generally by the numeral 10 is shown formed integral with a headgear framework 12 for supporting a night vision goggle 14 thereon. The goggle mounting bracket 10 includes a pair of rails 16 and 18, and a carriage 20 slideably fixed between one rail 16 and a rod 42. The goggle 14 includes a release lever 22 for releasing the goggle engagement with the carriage 20 in a manner to be described in more detail below. The goggle 14 is provided with a pair of eyepieces 24 and 26 through which distant and dimly lit objects may be seen.

In accordance with an important feature of the invention, a finger-operated plunger assembly 28 is provided with the carriage 20 which, when depressed, is operable for sliding the carriage 20 along the rail 16 and the rod 42. The goggle 14 can thus be moved closer or further from the eyes of the wearer. Because the headgear framework 12 is firmly attached to the wearer's head by the straps 30 and 32, and because the goggle is rigidly engagable to the headgear, the goggle position with respect to the viewer's eyes remains relatively constant irrespective of head movements. For a more detailed description of the headgear framework 12, reference should be had to the above-identified related application entitled, "Night Vision Goggle Headgear".

The Adjustable Mounting Bracket

Figure 2:
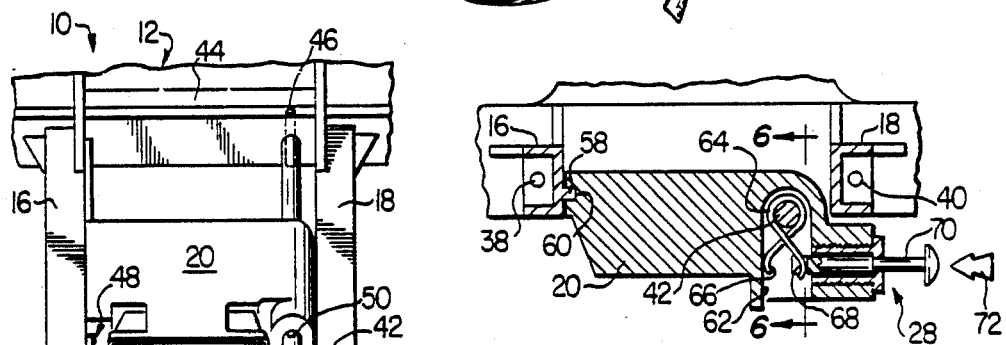
FIG. 2 is a frontal isometric view of the goggle mounting apparatus.

With reference to FIG. 2 of the drawings, where like and corresponding elements are identified by the same reference characters, the goggle mounting bracket 10 is shown removed from the headgear 12. The goggle 14 is also shown detached. The mounting bracket 10 includes a front plate 34, with the rails 16 and 18 held therebetween. The front end of rails 16 and 18 are secured to the front plate 34 by screws 38 and 40, and are integral with headgear 12 at the other end. A rod 42 is disposed parallel to the rails 16 and 18, and is fixed at one end to a boss 44 in headgear 12 by interference fit pin 46.

The carriage 20 is slideable at one side edge thereof by a tongue and groove arrangement 48, and at the other side edge thereof by the rod 42. The carriage 20 has a bore 50 therethrough for slideably receiving the rod 42. While the rod 42 and associated bore 50 are shown circular in cross section, many other shapes will function with equal effectiveness. To be described in more detail below, the finger-operated plunger assembly 28 is fixed to the carriage 20, and is operative to provide releasable engagement of the carriage 20 to the rod 42. With this construction, the carriage 20 can be slideably moved at any desired position along the rod 42.

The carriage 20 additionally includes a goggle receptable 52 for releasable engagement of a goggle stud (not shown in FIG. 1). The front plate 34 of the mounting bracket 10 includes a cutout 54 providing clearance for engaging the goggle into the receptable 52.

The front plate 34, as well as the carriage 20 may be injection molded with a twenty percent glass-filled plastic resin. A high strength, lightweight plastic well suited for such use is identified as Ultem, no. 2020, manufactured by the General Electric Corporation. The rod 42 and most of the finger-operated plunger assembly 28 is constructed of stainless steel, to thereby provide a corrosion resistant assembly.

Figure 3:
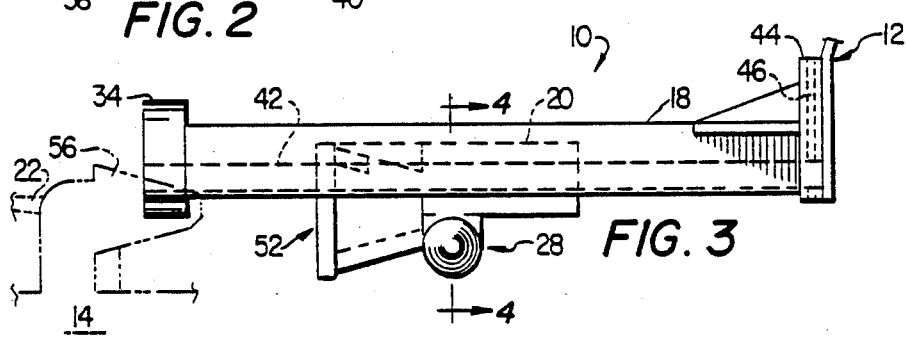
FIG. 3 is a side view of the goggle mounting apparatus.

A side view of the goggle mounting bracket 10 is shown in FIG. 3. As can be seen from the figure, the finger-operated plunger assembly 28 and the goggle receptacle 52 are integral with the carriage 20, all slideably movable on rod 42. The carriage 20 can move axially along the rod 42 until abutted with either the front plate 34 or the boss 44 on headgear 12. As noted, the goggle receptacle 52 is slung below the rails 16 and 18 and the front plate 34 to provide ready access to the goggle engaging stud 56, shown in phantom.

Figure 4:
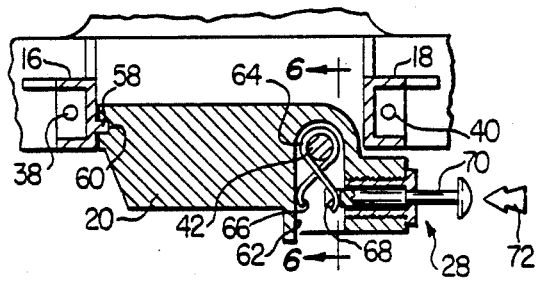
FIG. 4 is a sectional view of FIG. 3, taken along line 4—4 thereof.

In FIG. 4 the finger-operated plunger assembly 28 is shown in considerable more detail. As noted in the figure, the carriage 20 is moveable along with rail 16 by a tongue 58 slideable in a groove 60. The carriage 20 is molded with a cavity 62 in communication with the carriage bore 50. The rod 42 therefore passes through the cavity 62.

In keeping with the invention, the plunger assembly 28 functions in cooperation with a coil spring 64 disposed within the cavity 62 and encircling the rod 42. The coil spring 64 is of the type having hairpin ends 66 and 68. A plunger 70 is movable transversely with respect to the rod 42 in engagement with spring end 68. Importantly, when plunger 70 is depressed in the direction of arrow 72, spring end 68 will be compressed toward spring end 66, thereby releasing the frictional engagement of the spring coil 64 from the rod 42. The spring end 66 abuts with the wall of cavity 62 and is thus constrained.

FIGS. 5a and 5b illustrate respectively the friction engagement and release of the coil spring 64 with the rod 42. FIG. 5a illustrates the spring coil 64 in its relaxed state. When relaxed, spring ends 66 and 68 are spaced apart, as shown. The inside diameter of the relaxed spring coil 64 are tightly engaged with the outer surface of the rod 42. In practice, the diameter of rod 42 is about 0.218 inch, while the inside diameter of the relaxed spring, when removed from the rod 42, is about 0.212 inch. Thus, the inside surface 74 of each coil of spring 64 frictionally engages the rod 42, thereby preventing the lateral movement of the rod 42 within the spring coil 64. While additional coils of spring 64 may provide more engaging surface area, the increase in the inside coil diameter when ends 66 and 68 are brought together correspondingly decreases. Accordingly, about four coils have been found to provide an adequate change in inside diameter between the relaxed and compressed states. Also, with four coils, a 20:1 gripping force is provided. That is, for every pound of force exerted axially between the spring coil 64 and rod 42, the spring provides sufficient gripping force to support twenty pounds of axial force.

In FIG. 5b the spring coil 64 is released from engagement with the rod 42 by pressing spring ends 66 and 68 together, as shown by the arrows. The spring coil 64 is constructed so that when the ends thereof are pressed together, the inside diameter increases to about 0.220 inch, providing clearance 76. Lateral movement of the rod 42 with respect to the spring coil 64 is thus made possible.

FIG. 6 illustrates the spring coil 64 encircling the rod 42 and disposed within the cavity 62. As noted above, the spring coil 64 is constructed of four turns, and of spring quality wire, such as stainless steel or other piano-type wire. The diameter of the spring wire itself is about 0.040 inch. While the rod 42 is shown to be solid in construction, it may also be tubular in nature. In accordance with an important feature of the invention, the sliding action of the spring coil 64 over the rod 42 provides self-cleaning surfaces, thereby enhancing the positive engagement action therebetween. When the spring coil 64 is engaged with the rod 42, lateral movement of the spring coil 64 within the cavity 62 is prevented by providing very little clearance between the spring end surfaces 78 and 80 and the sidewalls of the cavity 62. With this construction, when the spring coil 64 is frictionally engaged about the rod 42, there is very little lateral play of the carriage 20 with respect to the rod 42.

FIGS. 7 and 8 illustrate alternative embodiments of the spring coil 64. In FIG. 7, there is shown a cross section of a spring 82 with flat internal surfaces 84. The inside of the spring 82 is ground to form the flat internal surfaces 84. Moreover, the internal surfaces 84 provide substantially more surface area, and thus a higher degree of frictional engagement with the rod 42.

FIG. 8 illustrates a spring 86 having square cross-sectionally shaped coils 88. With larger inside surface areas than exists in circular wire, the springs 82 and 86 are less susceptible to wear due to the adjustment sliding of the spring with respect to the rod 42.

The finger-operated plunger assembly 28 of FIG. 9 is provided for pressing together and releasing the spring ends 66 and 68. Formed integral with the carriage 20 is an internally threaded barrel 90. The threaded bore 92 of the barrel 90 is axially aligned with spring end 68. An externally threaded sleeve 94 mates with the threaded bore 92 of the barrel 90. Integral with the outside end of the sleeve is a hex-shaped flange 96. Thus, when the sleeve 94 is screwed into the threaded bore 92, the hex flange 96 can be tightened with a wrench against the boss 98 of the barrel 90. The threaded sleeve 94 includes a bore therethrough having a first inside diameter 100 and a second smaller diameter 102. A shoulder 104 of the sleeve bore forms the point of discontinuity between the two diameters 100 and 102.

The plunger 70 is slideable within sleeve 94 and threadably coupled to a slotted spring engaging member 106. The plunger 70 includes a threaded shank 108 which is threaded into a threaded bore 110 of the spring engaging member 106. The spring engaging member 106 is constructed with an outside diameter for sliding within the larger diameter bore 100 of the sleeve 94. The end 112 of the spring engaging member 106 abuts against shoulder 104 of the sleeve 94. The plunger 70 additionally includes a shaft 114 of diameter slideable within smaller diameter bore 102 of sleeve 94. Shaft 114 is integral with finger button 116 so that when pushed into the sleeve 94, the slotted end 118 of the spring engaging member 106 is pushed into spring cavity 62 releasing engagement of the spring coil 64 with the rod 42. When the plunger 70 is released, the coil spring 64 relaxes and returns the plunger 70 outwardly until the end 112 of the spring engaging member 106 abuts shoulder 104 of the sleeve 94. The noted abutment prevents the plunger 70 from traveling too far and allowing the spring end 68 to become dislodged from the slotted end 118 of member 106. The length of shaft 114 is longer than the corresponding length of the smaller diameter bore 102 of sleeve 94 by the distance in which it is desired to compress spring ends 66 and 68 together. The difference in these lengths thus comprises the travel of plunger 70 within threaded sleeve 94. As can be seen, when the plunger 70 is inserted into the sleeve 94 and threaded into the spring engaging member 106, the two are slideably fixed within the sleeve 94. The plunger assembly 28 is then threaded into and tightened on the barrel 90.

FIG. 10 is a top view of the slotted spring engaging member 106, illustrating the slot 118 cut into the end of the member. As can be visualized, when the threaded sleeve 94 is screwed into the threaded bore 92 of barrel 90, the finger button 116 is angularly oriented so that the slot 118 captures the spring end 68 therebetween.

The hex flange 96 is then tightened and secured against barrel boss 98.

In FIG. 11 the carriage adjusting apparatus is shown fully assembled within the cut-a-way portion of the carriage 20. With the foregoing structure, when the finger button 116 of the finger-operated plunger assembly 28 is pressed in the direction of arrow 72, spring end 68 is forced toward spring end 66, whereupon the spring coil 64 is released from engagement around the rod 42. Spring end 66 engages the sidewall of cavity 62, thereby preventing rotational movement of the spring coil 64. With the finger button 116 depressed, the carriage assembly 20 can be slideably moved forward or backward, as indicated by arrow 120, along the tongue and groove arrangement 48 and rod 42 to thereby adjust the goggle 14 axially with respect to the viewer's eyes. When adjusted to the desired position, the finger button 116 is released, whereupon the frictional engagement of the spring coil 64 around the rod 42 prevents movement of the goggle 14 with respect to the headgear 12. Unlike a micrometer movement, which is also capable of fine adjustments, the adjusting structure of the invention can be moved rapidly from one end of the adjusting range to the other end.

The Quick Release Mechanism

In accordance with another feature of the invention, there is shown in FIG. 12 the quick release mechanism for releasing the goggle 14 from the carriage 20. As noted above, the carriage 20 includes a receptable 52 for receiving and latching therein the tapered stud 56 which is molded integral with the goggle case 122. The carriage receptable 52 includes four inner sidewalls, such as 124, all converging toward a rearward point. The goggle stud 56 includes four corresponding outer sidewalls, such as 125, which are also tapered inwardly, so as to mate with the receptable sidewalls 124. Accordingly, the goggle stud 56 is self-centering within the receptable 52, thereby facilitating the attachability of the goggle 14 to the slideable carriage 20 eventhough grossly misaligned therewith.

The goggle stud 56 is formed integral with the goggle case 122 through an elbow 126. The stud elbow 126 includes a conduit 128 through which the release lever 22 protrudes. The carriage receptable 52 includes an access well 130 located in the top thereof, and through which a catch mechanism (not shown in FIG. 12) can be accessed. The tapered end of the goggle stud 56 includes a vertical notch 132 which also allows access to the catch mechanism when the stud 56 is engaged within the carriage receptable 52.

The details of the quick release mechanism are illustrated more fully in FIG. 13, where the goggle stud 56 is shown engaged within the carriage receptacle 52. The release lever 22 is spring loaded, and is shown in its rest position. The release lever 22 is also shown in phantom as it would appear when depressed to release the goggle 14 from the carriage receptacle 52. The release lever 22 is disposed within the elbow conduit 128 and made pivotal thereto by a split pin 134 press fit within aligned holes in the elbow 126. On the undersurface of the lever 22 is a large bore 135 for housing the end of a return spring 136 captured between such bore 135 and a sidewall 138 of the elbow conduit 128. The spring 136 assures the return of lever 22 to the rest position shown in solid lines.

Located at the inner end of the release lever 22 is a transverse notch 140. The notch 140 includes a curved shoulder 142 engagable with a catch arm 144 which is fixed to the bottom of the access well 130 in the carriage receptacle 52. The catch arm 144 includes a catch lug 146 which is latchable with the shoulder 142 of the notch 140, thereby preventing outward lateral movement of the goggle stud 56 with respect to the carriage receptacle 52. The release lever 22 also includes at its inner end thereof a beveled undersurface 148 for camming over the catch lug 146 when the goggle stud 56 is forced into the carriage receptable 52. With this arrangement, there is an automatic engagement between the lever shoulder 142 and the catch lug 146 without the need to hold the outer end 150 of the release lever down. When the goggle stud 56 is engaged within the carriage receptacle 52, and latched by the catch mechanism, vertical and lateral movement of the goggle and carriage 20 is prevented as a result of the tight fit of the stud outer surfaces 125 with the receptacle inner surfaces 124.

When it is desired to release the goggle 14 from the headgear carriage 20, lever end 150 need only be depressed downwardly, whereby the shoulder 142 thereof is unlatched from the catch lug 146 on catch arm 144. With the release lever 22 thus depressed, the goggle stud 56 can be removed from the carriage receptacle 52. Importantly, because of the tapered nature of the stud 56, and the corresponding tapered surfaces 124 of the carriage receptacle 52, the goggle 14 need not be removed axially outwardly from the carriage receptacle 52. Rather, once the goggle stud 56 has been unlatched from the carriage catch mechanism, the goggle 14 may be moved outwardly and upwardly, or outwardly and sidewardly, or downwardly to effect disengagement. It can be appreciated that this is advantageous insofar as no particular outward movement of the goggle is required. Indeed, all that need be required to effect a quick release of the goggle 14 from the carriage receptacle 52 is a sharp downward slap to the end 150 of the release lever 22. With the release lever 22 arranged on the goggle 14 as shown, the downward impact also applies a downward force to the goggle 14 itself, thereby facilitating a quick removal of the goggle 14 from the headgear 12.

As can be seen from FIG. 13, the release lever 22 includes indentations 152 on the top side thereof for providing a positive grip with the lever. Of course, the return spring 136 is of sufficient strength such that inadvertent touching of the release lever 22 does not allow a depression thereof sufficient to disengage the catch mechanism.

In accordance with yet another feature of the invention, the catch arm 144 is made adjustable to provide positive engagement of the catch mechanism when the goggle stud 56 is fully engaged within the carriage receptacle 52. More specifically, a fastening screw 154 passes through an elongate hole 156 in the catch arm 144, and through a hole 158 in the bottom of the access well 130. Nut 160 is then screwed onto the fastening screw 154. The fastening screw 154 can thus be loosened to adjust the catch arm 144 fore and aft, and tightened again when the catch arm 144 has been adjusted as desired. An eccentric screw 162, to be described more fully below, also passes through a hole 164 in the bottom of the access well 130, and through a hole 166 in the catch arm 144. Rotation of the eccentric screw 162 is thus effective to procure fine lateral adjustments of the catch arm 144.

The catch arm 144 adjusting arrangement is shown yet in more detail in FIG. 14. The shank of fastening screw 154 fits through the elongate hole 156 of the catch arm 144. The catch arm 144 can thus be adjusted laterally until the hole ends abut with the shank of the fastening screw 154. The hex nut 160 fits within a hex recessed area 168 on the underside of the access well 153, and thus is prevented from turning when the fastening screw 154 is turned. The eccentric screw 162 includes a large diameter shank 170 which rotates in the hole 164 disposed in the bottom of the access well 130. A second smaller diameter shank 172 is offset from the axis of the larger diameter shank 170. The smaller shank 172 fits within a similar sized hole 166 in the catch arm 144. Thus, when the eccentric screw 162 is rotated, the smaller sized shank 172 transverses an orbital path, thereby moving the catch arm 144 accordingly. Once the desired lateral position of the catch arm 144 has been set by the eccentric screw 162, a nut 174 and washer 176 are used in securing the catch arm 144 to the bottom of access well 130.

The head of eccentric screw 162 is provided with cross slots 178 as shown in FIG. 15. Because the eccentric screw 162 is adjusted from the bottom side of the carriage receptacle 52, the cross slots 178 permit the screw 162 to be accessible and tightened with short rotational movements. Also, the nut 160 of fastening screw 154 is shown recessed within the hex well 168.

The adjustment of the goggle stud 56 with respect to the carriage receptacle 52 is accomplished as follows. First, the goggle stud 55 is inserted into the carriage receptacle 52 until the transverse notch 140 is engaged with the catch lug 146. Fastening screw 154 and eccentric screw 162 are loosened from their respective nuts 160 and 174. The eccentric screw 162 is then rotated in a direction such that the lug 146 on the catch arm 144 pulls the release lever 22, and thus the goggle stud 56 firmly into the tapered carriage receptacle 52. The fastening screw 154 is then tightened firmly. In a similar manner, the nut 174 of the eccentric screw 162 is also tightened to thereby secure the catch arm 144 to the access well bottom 130 at two locations thereon.

Because the catch arm 144, and thus the catch lug 146, may be slightly turned as shown in FIG. 16, the latch shoulder 142 is curved on an inside surface of the transverse notch. This allows a positive surface engagement of the latching mechanism between the catch arm lug 146 and the latch shoulder 142, irrespective of the orientation of the catch arm 144. Alternatively, the catch lug 146 can be curved.

In the preferred embodiment of the invention, the goggle stud 56 has tapered upper and lower surfaces creating an angle of about thirty degrees. The upper and lower inner surfaces of the carriage receptacle 52 are similarly angled. As noted in FIG. 16, the vertical sidewalls of the stud 56 are tapered inwardly to also form an angle of thirty degrees. The associated inner sidewalls of the receptacle 52 are comparably angled. Further shown in FIG. 16 is the vertical notch 132 in the goggle stud 56 for allowing screwdriver access to the fastening screw 154. To provide a highly reliable and corrosion resistant device, the catch mechanism hardware, together with the release lever 22 is constructed either of stainless steel or a plated metal.

From the foregoing, an improved night vision goggle adjustable carriage is provided. The adjustable carriage which includes a receptacle for engagement with the night vision goggle, is slideable along a rod. Disposed around the rod within the carriage is a coil spring which, when relaxed, tightly engages the rod and prevents fore and aft movements of the carriage. A finger-operated plunger assembly, when depressed, is effective in forcing the two ends of the coil spring together, thereby releasing the engagement of the spring with the rod. The carriage assembly can thereby be adjusted when the finger-operated plunger is depressed.

The specific embodiments disclosed herein are intended to be exemplary of the principles of the invention, and are not restrictive thereof since various modifications, readily apparent to those familiar in the art, may be made without departing from the spirit and scope of the invention as claimed hereinbelow.

What is claimed is:

1. A device mountable to a viewer's head for adjustably positioning vision equipment with respect to the viewer's line of sight, comprising:
   a frame member for being mounted stationary with respect to the viewer's head;
   a carriage slideably fixed to said frame member for adjusting said carriage to any desired position with respect to said frame member;
   apertured locking means adjustable with said carriage and encircling a portion of said frame member and including means for opening the aperture for allowing adjustment of said carriage with respect to said frame member and for restricting the aperture to thereby lock said carriage in said any desired position with respect to said frame member; and
   means for mounting the vision equipment to said carriage to thereby align the vision equipment with the viewer's line of sight by said adjustment.

2. The device of said claim 1 wherein said carriage and said frame member are slideably attached by a tongue and groove arrangement.

3. The device of claim 1 wherein said frame member includes a rod, and said carriage further includes a bore slideable over said rod for supporting said carriage and for allowing adjustable positioning of said carriage with respect to said frame member.

4. The device of claim 2 wherein said carriage and said frame member are slideably attached by a bore and rod arrangement.

5. The device of claim 1 wherein said locking means includes detentless friction means for locking said carriage to said frame member.

6. The device of claim 3 wherein said locking means includes friction means engagable with said rod.

7. The device of claim 6 wherein said friction means comprises a spring engagable with said rod.

8. The device of claim 7 wherein said spring comprises a coil spring disposed around said rod and locked thereto when relaxed, and expandable around said rod for movement thereon.

9. The device of claim 8 wherein said carriage includes a cavity in communication with said bore, and said coil spring is disposed in said cavity so that said rod disposed in said first bore passes through said coil spring.

10. The device of claim 8 wherein said coil spring includes plural coils, the inside surface of each said coil being flattened.

11. The device of claim 10 wherein each coil of said spring is cross-sectionally square.

12. A device mountable to a viewer's head for adjustably positioning vision equipment with respect to the viewer's line of sight vision, comprising:
   a frame member;
   an elongate rod fixed to said frame member;
   a carriage having a bore for slideably receiving therein said rod so that said carriage is supported by said rod;
   means for fixing the vision equipment to said carriage; and
   means encircling and expandable and retractable radially about said rod for frictionally locking said carriage at any desired position along said rod.

13. The device of claim 12 further including a tongue and groove arrangement slideably fixing said carriage to said frame member.

14. The device of claim 12 wherein said locking means includes means attached to said carriage and movable transversely to said rod for releasing the locking engagement of said carriage to said frame member.

15. The device of claim 12 further including a headgear molded integral with said frame member.

16. The device of claim 12 wherein said locking means includes detentless friction means for locking said carriage to said frame member.

17. The device of claim 16 wherein said detentless friction means is engagable with said rod.

18. The device of claim 16 wherein said friction means comprises a spring engagable with said rod.

19. The device of claim 18 wherein said spring encircles said rod.

20. An adjustable night vision goggle mounting bracket, comprising:
   a carriage with a bore therethrough, a cavity in communication with said bore, and a threaded barrel in communication with said cavity;
   means for mounting the goggle to said carriage;
   a rod slideable through the bore of said carriage;
   a coil spring with hairpin ends disposed in said cavity, and spring coils encircling said rod and being frictionally engagably therewith, one said hairpin end being engagable with the sidewall of said cavity, and the other hairpin end being disposed adjacent said threaded barrel;
   a finger-operated plunger assembly including:
      a sleeve with threads engagable with the threads of said barrel, said sleeve having a first and second bore with different diameters,
      a spring engaging member slideable in the larger diameter bore of said sleeve, said member having a threaded hole, and a slot for capturing therein said other hairpin end,
      a plunger having a threaded end engagable with the threaded hole of said spring engaging member, a shank slideable within the smaller diameter bore in said sleeve, and finger means for pressing on said plunger to force the hairpin ends of said spring coil together to release the engagement of said spring coils from around said rod.

21. The goggle mounting bracket of claim 20 wherein siad cavity includes a width substantially the same as the axial length of said coil spring.

22. The goggle mountig bracket of claim 20 wherein said cavity is transverse to said bore, and said threaded barrel is transverse to said cavity.

23. The goggle mounting bracket of claim 20 wherein said coil spring includes four coils.

24. The goggle mounting bracket of claim 20 wherein said coil spring includes a coil with an inside diameter smaller then the diameter of said rod when said spring is relaxed, and an inside diameter larger than the rod diameter when the hairpin ends of said spring are pressed together.

25. A device mountable to a viewer's head for adjustably positioning vision equipment with respect to the viewer's line of sight, comprising:
- a frame member for being mounted stationary with respect to the viewer's head, said frame member including a rod;
- a carriage slideably fixed to said frame member and including a bore through which said rod is slideable for adjusting said carriage to any desired position with respect to said frame member;
- a locking apparatus including a coil spring disposed around said rod and locked thereto when relaxed, and expandable around said rod for adjusting said carriage to said any desired position; and
- means for mounting the vision equipment to said carriage so that the vision equipment can be aligned with the viewer's line of sight.

26. The device of claim 25 wherein said coil spring includes free ends compressible to effect the expansion of said spring around said rod.

27. The device of claim 26 further including a manually actuated mechanism for compressing said free ends.

28. The device of claim 27 wherein said manually actuated mechanism is fixed to said carriage and thus moves therewith.

29. The device of claim 27 wherein said manually actuated mechanism comprises a slotted plunger for receiving therein one said free end, and movable longitudinally toward the other free end for compressing said free ends together.

30. The device of claim 29 wherein said plunger comprises a sleeve with a bore having a first and second section with different inside diameters, a finger-operable pin slideable in the smaller diameter bore, said slotted stud being fastened to said finger-operable pin.

* * * * *